(12) United States Patent
Gebbink et al.

(10) Patent No.: US 10,315,848 B2
(45) Date of Patent: Jun. 11, 2019

(54) APPARATUS AND METHOD FOR DISCHARGING SPOUTED CONTAINERS

(71) Applicant: Fuji Seal International, Inc., Osaka, Osaka-shi (JP)

(72) Inventors: Jeroen Gerrit Anton Gebbink, Helmond (NL); Marinus Antonius Leonarda Van Heck, Haarsteeg (NL)

(73) Assignee: Fuji Seal International, Inc., Osaka (JP)

( * ) Notice: Subject to any disclaimer, the term of this patent is extended or adjusted under 35 U.S.C. 154(b) by 0 days.

(21) Appl. No.: 15/473,805

(22) Filed: Mar. 30, 2017

(65) Prior Publication Data

US 2017/0283175 A1   Oct. 5, 2017

(30) Foreign Application Priority Data

Mar. 31, 2016 (NL) ..................... 2016517

(51) Int. Cl.
 *B65G 19/02*   (2006.01)
 *B65G 19/28*   (2006.01)
 (Continued)

(52) U.S. Cl.
 CPC .......... *B65G 19/025* (2013.01); *B65B 43/14* (2013.01); *B65B 43/16* (2013.01); *B65B 43/20* (2013.01);
 (Continued)

(58) Field of Classification Search
 CPC .................................................. B65G 19/025
 (Continued)

(56) References Cited

U.S. PATENT DOCUMENTS 5,150,652 A * 9/1992 Yamamoto ............. B65H 9/101
                                            101/232
5,893,259 A * 4/1999 Posge ..................... B65B 5/101
                                            53/247
(Continued)

FOREIGN PATENT DOCUMENTS

EP         1195240 A2    4/2002
WO    WO-2015128427 A1   9/2015

OTHER PUBLICATIONS

"Netherlands Application Serial No. NL2016517, Search Report dated Dec. 13, 2016", (dated Dec. 13, 2016), 2 pgs.
(Continued)

*Primary Examiner* — Gene O Crawford
*Assistant Examiner* — Lester Rushin, III
(74) *Attorney, Agent, or Firm* — Schwegman Lundberg & Woessner, P.A.

(57) ABSTRACT

The present disclosure relates to a discharge apparatus for discharging a plurality of flexible spouted containers, the apparatus comprising: a container support comprising a support element with an elongated opening for carrying a row of spouts of a plurality of spouted containers from an inlet to an outlet, wherein the inlet of the support element is configured to receive successive batches of spouted containers in the elongated opening; a biasing unit configured to move at least a subset of the spouts received inside the elongated opening in the support element towards the outlet, wherein the biasing unit further is configured to continuously apply a biasing force to the subset of spouts to continuously discharge the containers from the outlet.

18 Claims, 16 Drawing Sheets

(51) Int. Cl.

| | | |
|---|---|---|
| *B65B 43/14* | (2006.01) | |
| *B65B 43/16* | (2006.01) | |
| *B65B 43/44* | (2006.01) | |
| *B65B 43/46* | (2006.01) | |
| *B65B 43/50* | (2006.01) | |
| *B65G 47/82* | (2006.01) | |
| *B65G 47/08* | (2006.01) | |
| *B65G 47/61* | (2006.01) | |
| *B65B 43/20* | (2006.01) | |

(52) U.S. Cl.
CPC ............ *B65B 43/44* (2013.01); *B65B 43/465* (2013.01); *B65B 43/50* (2013.01); *B65G 19/282* (2013.01); *B65G 47/082* (2013.01); *B65G 47/61* (2013.01); *B65G 47/82* (2013.01); *B65G 2201/0235* (2013.01); *B65G 2201/0238* (2013.01)

(58) Field of Classification Search
USPC .......... 198/530, 531, 465.4, 418.7, 429, 430
See application file for complete search history.

(56) References Cited

U.S. PATENT DOCUMENTS

| | | | |
|---|---|---|---|
| 9,776,751 B2 * | 10/2017 | Lukes | ..................... B65B 35/36 |
| 2002/0060136 A1 | 5/2002 | Hiramoto et al. | |
| 2005/0061620 A1 | 3/2005 | Bonnain et al. | |
| 2010/0170591 A1 | 7/2010 | Murray | |

OTHER PUBLICATIONS

"Netherlands Application Serial No. NL2016517, Written Opinion dated Dec. 13, 2016", (dated Dec. 13, 2016), 7 pgs.

* cited by examiner

APPARATUS AND METHOD FOR DISCHARGING SPOUTED CONTAINERS

PRIORITY CLAM

This application claims the benefit of priority of Netherlands Application No. NL2016517, filed 31 Mar. 2016, the contents of which are incorporated herein in ifs entirety.

TECHNICAL FIELD

The present disclosure relates to a discharge apparatus and method for discharging a plurality of flexible spouted containers. The disclosure also relates to a discharge system including such discharge apparatus for discharging a plurality of flexible containers from a tubular storage assembly, wherein each of the containers comprises a dispensing spout and wherein the storage assembly comprises a plurality of elongated guiding elements onto which a plurality of rows of dispensing spouts can be carried, wherein the guiding elements are configured to be maintained in a substantially tubular arrangement while the containers extend in a generally helical trajectory in the interior formed by the tubular arrangement.

BACKGROUND

Flexible containers for keeping fluid or dry products, such as a liquid, granular material, powder or the like, are known in the art. One example of a flexible container is a flexible container, for instance comprising a laminate composed of sheets of plastic or the like. For instance, a container may be made of a front and back wall comprising one or more flexible film, facing one another and joined, for example welded, along their edges. The container has an opening means to access the contents of the container. The opening means may be a spout sealed to the upper part of the flexible container, between the front and back wall. The opening can be sealed off, for instance by a removable screw cap, and may even provide for resealing the container after it has been opened.

The flexible containers can be stored in a tubular storage assembly as described in document WO 2015/128427 A1, herein incorporated by reference. The spouted containers according to this document are loaded in a number of elongated guiding elements. The guiding elements are brought into a tubular arrangement, for instance by attaching the guiding elements to each other. The containers are stored in the interior of this tubular arrangement, for instance by moving the containers one by one into the guiding elements in such a manner that the containers extend in a helical trajectory.

Unloading of the containers from the tubular storage assembly requires a discharge device. The discharge device unload the containers one by one from the respective guiding elements of the storage assembly. The containers may then be transported on a transport line downstream to one or more further processing stations, for instance a container handling line wherein the containers are cleaned, cooled, filled with foodstuffs, etc. In order to properly deliver the containers to the downstream processing system the supply of containers needs to be designed in such a manner that containers are continuously available for further transporting. For instance, when the containers are discharged from the tubular storage assembly in a batchwise manner, a further discharge operation needs to be performed to make the containers continuously available.

Additionally, some types of downstream further processing stations require that containers are urged towards the processing station, for instance because the processing station have no means to transport the containers into the station. This ensures a good infeed of the container into the station and a maximum speed to handle the containers at the station.

It is an object to provide an apparatus and method for discharging containers wherein at least one of the disadvantages of the prior art has been resolved. It is a further object to provide an apparatus and method that provide for a fast, reliable and/or efficient discharge of containers from a tubular storage assembly as defined herein, while the containers may be delivered in a continuous manner.

According to a first aspect at least one of the above objects and/or other objects may be at least partially achieved in a discharge apparatus for discharging a plurality of flexible spouted containers, the apparatus comprising:

a support element with an elongated opening for carrying a row of spouts of a plurality of spouted containers from an inlet to an outlet, wherein the support element is configured to receive successive batches of spouted containers in the elongated opening;

a biasing unit configured to move at least a subset of the spouts in the elongated opening in the support element towards the outlet, wherein the biasing unit further is configured to continuously apply a biasing force to the subset of spouts to continuously urge the containers towards the outlet.

The biasing force may always be present, with essentially no interruptions. As soon as a downstream station is in need of one or more further containers, the biasing force may cause immediate transportation of the containers towards the station.

In embodiments of the present discharge apparatus the biasing force is always present, both in situations wherein the containers are continuously discharged and in situations wherein the discharge is performed intermittently (for instance when the containers are stopped temporarily by a controllable stop element). The biasing force may be applied irrespective of whether the spouts are stationary or are caused to move towards the outlet to continuously discharge the containers from the outlet.

According to an embodiment the biasing unit comprises:
a rotatable biasing element;
a drive motor configured to rotate the biasing element;
wherein the rotatable biasing element comprises a plurality of pusher elements and wherein at least one pusher element engages with the spouts and applies the biasing force to the subset of the spouts.

At least one pusher element may engage a spout and push it towards the outlet, causing all the spouts downstream of the engaged spout to travel towards the outlet or at least to be urged in that direction. The rotatable biasing element comprises at least two pusher elements, wherein the pusher elements are arranged in such a manner that essentially at all times at least one of the pusher elements is in contact with a spout. This ensures that the biasing force provided by the rotatable biasing element is continuously provided to the containers. More specifically, the rotatable biasing element may comprise a drive shaft and a plurality of pusher elements connected to the drive shaft at evenly distributed positions. By arranging the pusher elements at evenly distributed positions, for instance in a star-like arrangement and/or with equal angles between the pusher elements), the spouts experience a more constant biasing force.

The biasing unit is preferably configured to continuously discharge the containers which is discontinuously transported in the opening from the inlet.

In embodiments of the present disclosure the discharge apparatus comprises a controller configured to control the drive motor to vary the electric motor torque applied to the rotatable biasing element, wherein the controller is further configured to apply an enough torque to move the spouts towards the outlet and to continuously apply the biasing force to the spouts, but not to disturb the continuous discharge of the container from the outlet.

For instance, the controller may reduce the motor torque by reducing the electrical current to the drive motor in case the movement of the containers in the elongated opening is slowed and increase the motor torque again by increasing the current in case the containers are moved faster from the discharge apparatus to the further processing station. Therefore even when the movement of the containers through the elongated opening is changed, the containers are subjected to a biasing force. The containers will be available for immediate further transport when the further processing station so requires.

In further embodiments the discharge apparatus comprises a controllable means unit downstream of the rotatable biasing element that enables to passage of containers towards the downstream station in a controlled manner. The controllable means may comprise a controllable stop unit to prevent the containers in the outlet region to leave the discharge apparatus when activated and to allow the containers to be discharged from the outlet region when deactivated. In a specific embodiment the controllable stop unit comprises a stop element arranged close to the outlet of the elongated opening of the support element. The stop element is configured to be moved between a position wherein the passage of spouts is prohibited and a position wherein the spouts may pass. Other embodiments of the controllable means are conceivable as well. In certain embodiments the controller is not only configured to control the operation of the rotatable biasing element but also the operation of the controllable means. This controllable means may also be part of a downstream station. In either embodiment the controllable means allows a controlled delivery of the containers.

In embodiments of the present disclosure the pusher element comprises:
  a back plate fixedly connected to the drive shaft;
  a pusher plate pivotably connected to the drive shaft or to the back plate,
wherein the pusher plate is preferably arranged so as to be pivotable in a plane perpendicular to the drive shaft, wherein the pusher plate extends at a position in front of the pusher plate relative to the direction of rotation of the drive shaft;
  a spring element arranged between the pusher plate and back plate so as to bias the pusher plate in the direction of rotation.

In these embodiments the biasing action may be delivered by the spring element between the back plate and pusher plate.

The biasing unit may be configured to engage at least one of the spouts from a further batch of containers each time a further batch of containers is received in the elongated opening of the support element. In this manner the further (new) batch of containers is directly pushed towards the outlet and the biasing force is immediately available for this new containers as well.

The elongated opening in the container support may be shaped to comprise a circular arch portion. In this case the rotatable biasing element may be arranged to be rotatable around an axis positioned at or near the center point of the circular arch portion.

According to an embodiment at least one of the pusher elements is rotatable relative to at least one of the other pusher elements. In this manner a gap between each batch of containers can be closed, for instance when the end of the tubular storage assembly has been reached.

The biasing unit may comprise:
  a first pusher element;
  a second pusher element;
wherein the biasing unit is configured to rotate the second pusher element relative to the first pusher element.

The biasing unit may further comprise:
  a first drive motor configured to rotate the first pusher element;
  a second drive motor configured to rotate the second pusher element;
  a controller configured to control the first and second drive motor to rotate the first pusher element independently from the second pusher element.

According to an other aspect of the present disclosure a discharge system for discharging a plurality of flexible containers from a tubular storage assembly, wherein each of the containers comprises a dispensing spout and wherein the storage assembly comprises a plurality of elongated guiding elements onto which a plurality of rows of dispensing spouts can be carried, wherein the guiding elements are configured to be maintained in a substantially tubular arrangement while the containers extend in a generally helical trajectory in the interior formed by the tubular arrangement, the discharge system comprising:
  a storage assembly support configured to support the tubular storage assembly, the guiding elements extending in axial direction;
  a discharge device configured to remove the containers from the tubular storage assembly and move the containers one by one from the second end of the tubular storage assembly towards a discharge region,
  a discharge apparatus as defined herein, wherein the elongated opening of the discharge apparatus is arranged to receive spouted containers from a discharge region of the discharge device, wherein the discharge device comprises:
    a gripper unit;
    a drive configured to rotate the gripper unit relative to the storage assembly;
wherein the gripper unit is configured to grip dispensing spouts of containers successively passing by the gripper unit, to transport the gripped dispensing spouts and associated containers in essentially the axial direction and to accumulate the dispensing spouts and containers in the discharge region.

In an embodiment of the system the discharge device comprises a rotatable sweeper arm and a sweeper arm drive configured to rotate the sweeper arm for moving the accumulated spouts out of the gripper unit into the elongated opening of the discharge apparatus, and wherein the biasing unit comprises a rotatable biasing element configured to rotate at least partly synchronously with the sweeper arm.

According to a further aspect a method of discharging a plurality of flexible spouted containers is provided, the method comprising:
  receiving successive batches of spouted containers in an elongated opening of a support element for carrying the spouted containers from an inlet to an outlet of the support element, the batches of spouted containers being provided to the inlet in a discontinuous manner;

causing the spouts to move through the elongated opening towards the outlet while continuously maintaining a biasing force to at least a subset of the spouts received inside the elongated opening to bias the spouts and associated containers towards the outlet.

The maintaining of a biasing force to at least the subset of the spouts may further comprise applying a sufficient biasing force to continuously discharge the containers from the outlet.

BRIEF DESCRIPTION OF THE DRAWINGS

Further characteristics of the present invention will be elucidated in the accompanying description of various preferred embodiments thereof. In the description reference is made to the annexed figures.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

As will be apparent to those of skill in the art upon reading this disclosure, each of the individual embodiments described and illustrated herein has discrete components and features which may be readily separated from or combined with the features of any of the other several embodiments without departing from the scope of the present invention.

Any recited method can be carried out in the order of events recited or in any other order which is logically possible It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Tubular Storage Assembly

As herein the tubular storage assembly is an assembly of guiding elements placed in such arrangement that they define the shape of a tube. Herein the tubular storage assembly may therefore also be denoted by the term "tubular arrangement". Each of the guiding elements of the tubular storage assembly is configured to allow guiding of one or more containers so that the containers may be stored inside the interior formed by the combination of guiding elements. Several examples of a tubular storage assembly are described hereafter that may be unloaded by embodiments of the present discharge system.

Figure 1:
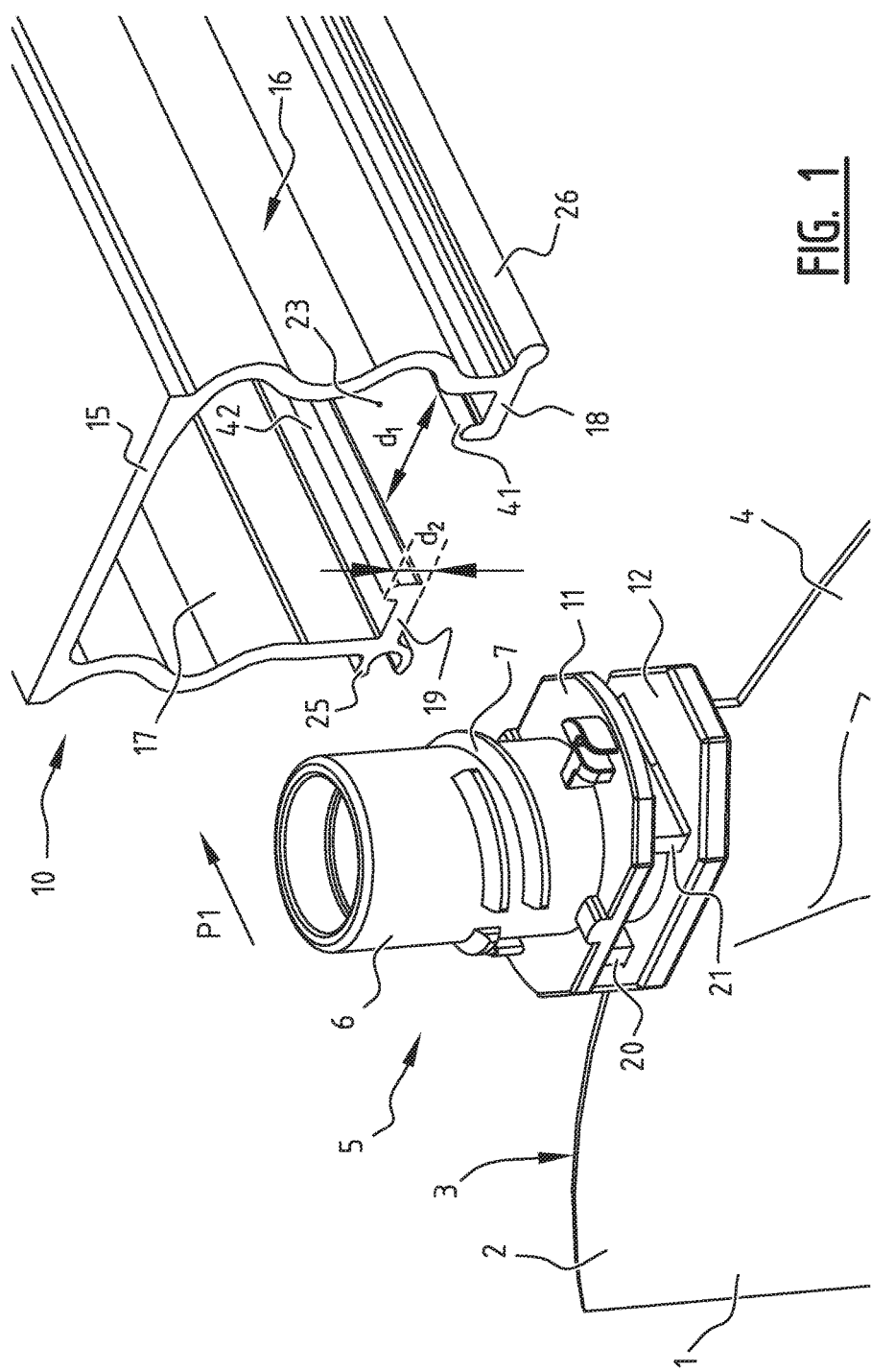
FIG. 1 a schematic side view of an embodiment of a guiding element and a spouted container to be loaded into the guiding element.
Figure 2:
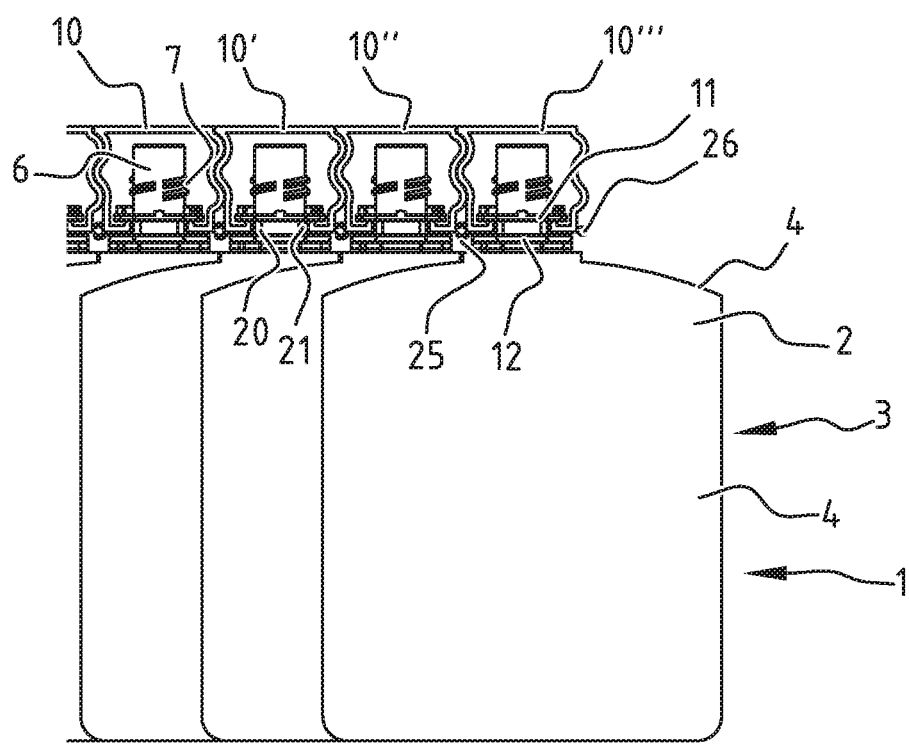
FIG. 2 a side view of a number of containers that have been loaded into a number of guiding elements.

FIGS. 1 and 2 show an example of a pouch container 1 (herein also referred to as a container or a pouch), comprising a front wall 2 and a back wall 3, both walls being made of thin, flexible film material, preferably plastic film material. The walls 2,3 are sealed along their circumferential edges 4 to form a package for flowable products, for example foodstuff, cosmetics, medicines, etc. In the upper edge of the container 1 a dispensing element, herein also referred to as a (dispensing) spout 5, is arranged. The spout 5 of the container 1 comprises an elongated dispensing tube 6. The outer surface of the dispensing tube 6 is provided with thread windings 7 for attaching a removable end cap (not shown) on the container 1 after it has been filled. The lower end of the dispensing tube 6 extends through the upper circumferential edge 4 and extends into the interior thereof so that the dispensing tube 6 may provide a fluid connection between the interior of the container 1 and its surroundings. Therefore the content of the container 1 may be dispensed when the end cap is removed. The dispensing tube 6 is provided with two lateral elements which serve to attach the container 1 to a guiding element 10. More specifically, the dispensing tube 6 comprises an upper flange part 11 and a lower flange part 12.

Guiding rail or guiding element 10 is an elongated section comprising an upper section part 15, a first section side part 16 and a second section side part 17, both section side parts extending roughly orthogonally with respect to the upper section part 15. At the free ends of the section side parts 16,17 a slotted carrier part for carrying the spout 5 of a spouted container 1 is provided. The carrier part comprises inwardly extending section flanges 18,19 forming a slot between the free ends of the flanges 18, 19. The distance ($d_1$) between the section flange 18 of the first section side part 16 and the section flange 19 of the second section side part 17 is slightly larger than the distance between upright walls 20,21 of the spout 5 and smaller than the width between the upper flange part 11 and the lower flange part 12 of the spout 5. Furthermore the section flanges 18,19 are provided at their respective inner ends with longitudinal ridges 41,42 along which the upper flange part 11 of the dispensing element (spout 5) of the container 1 can be slid. The distance between the upper flange part 11 and the lower flange part 12 of the spout 5, i.e. the height of a channel 23 defined in the guiding element 10, is slightly larger than the distance $d_2$ between the top and bottom of longitudinal ridges 41,42 and such that the longitudinal ridges 41,42 are properly maintained between the upper flange part 11 and the lower flange part 12. Therefore the container 1 can be moved easily into the guiding element 10 by sliding the spout 5 smoothly (in direction $P_1$) to be stably maintained within the guiding element 10 by the both flange parts 11,12 of the spout 5 and the section flanges 18,19 of the guiding element 10. The number of containers 1 that can be arranged in the guiding element 10 depends amongst others on the length of the guiding element 10 and the dimensions of the respective spouts 5 of the containers 1. As a not limiting example a typical guiding element 10 may carry between 50 and 60 containers.

Referring to FIG. 1 the first section side part 16 of the guiding element 10 comprises an outwardly extending flange forming a male coupling element 26. Similarly the opposite section side part 17 of the guiding element 10 comprises a female coupling element 25. The male and female coupling elements 26,25 extend along at least a substantial part of the length of the guiding element 10 and are dimensioned in such a way that the male coupling element 26 of the guiding element 10 can be inserted into the female coupling element 25 of a second guiding element 10' to mutually couple the guiding elements 10, 10'. The coupling elements 26,25 are configured to connect two or more parallel guiding elements 10,10'', while still allowing the guiding elements to pivot relative to one another, for instance between a flat arrangement to a curved one (more specifically, a tubular arrangement).

Storage Assembly Support

Figure 3A:
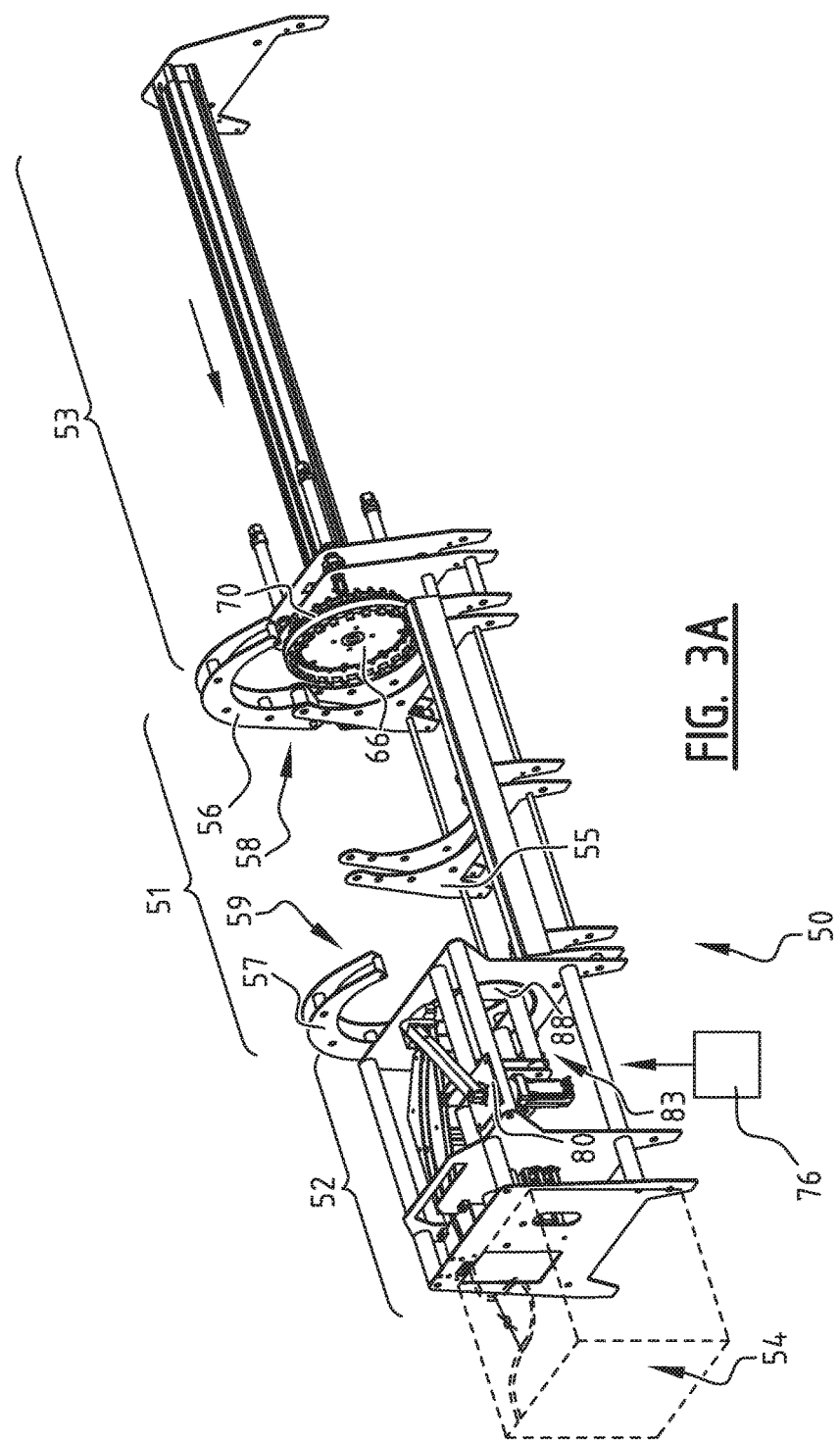
FIGS. 3A and 3B are schematic side views of an embodiment of the discharge system comprising both a discharge device and a discharge apparatus, without a tubular storage assembly and with a loaded tubular storage assembly, respectively.
Figure 3B:
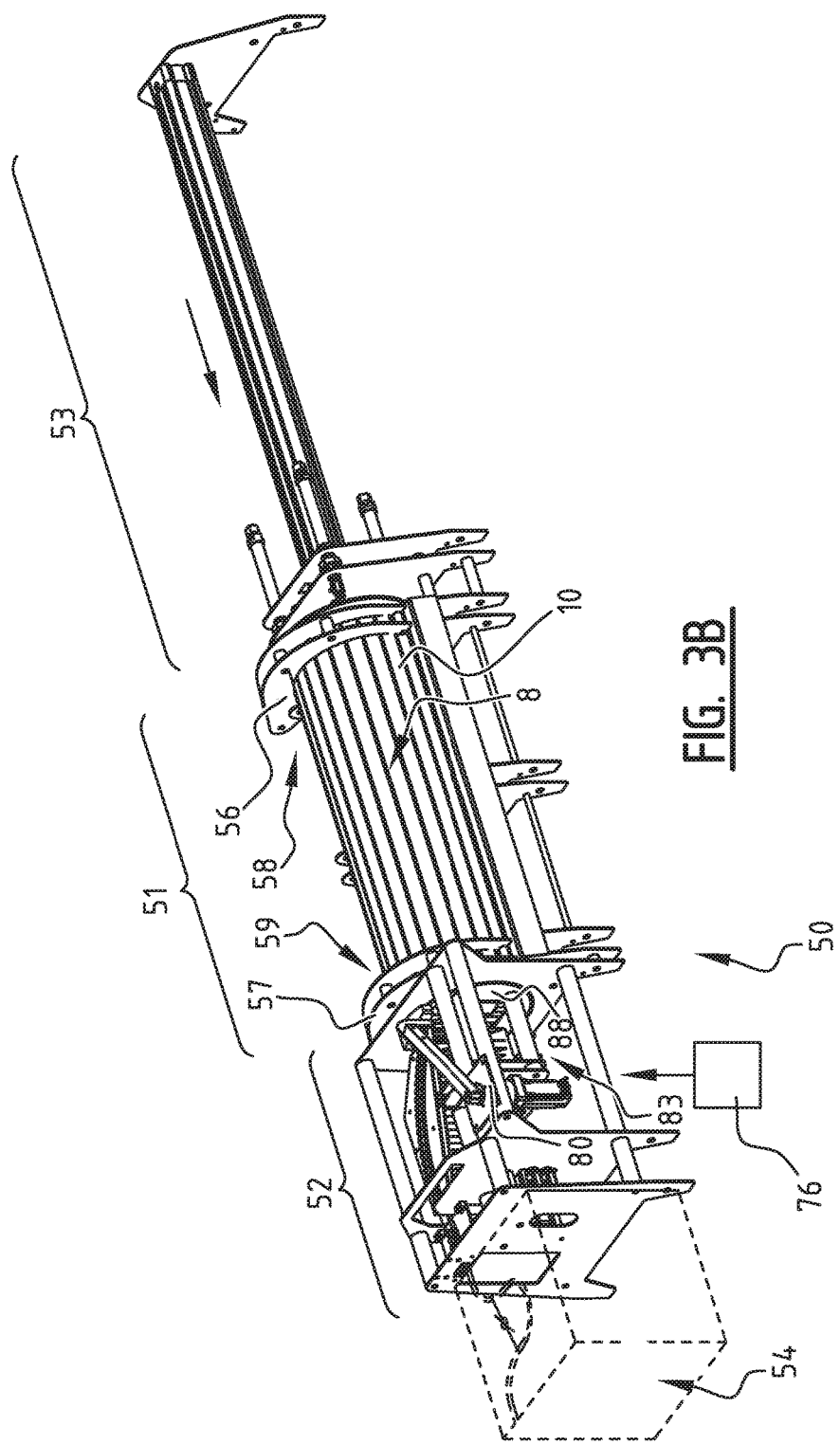

FIGS. 3A and 3B show an embodiment of a discharge system 50 for discharging a plurality of flexible containers (for instance pouches 1) that have been arranged in a tubular storage assembly 8. FIG. 3A shows the discharge system 50 without the tubular storage assembly 8, i.e. before the discharge system 50 is loaded with the tubular storage assembly 8. The discharge system 50 comprises a storage assembly support 51, a discharge device 52, a discharge apparatus 54 and, optionally, a pusher 53.

In case the storage assembly 8 comprises a number of guiding elements 10 made of more or less flexible material, the individual guiding elements 10 may be slightly movable relative to each other so that an accurate positioning of the guiding elements 10 with respect to the discharge device 52 is difficult to achieve. To provide an accurate positioning of the guiding elements 10 and therefore an accurate alignment of the guiding elements 10 with respect to the discharge device 52 in order to guarantee a reliable and fast operation of the discharge device 52, the storage assembly support 51 of the discharge system 50 comprises a stationary support frame 55 having curved sections on which the tubular storage assembly 8 can be placed. The storage assembly support 51 also comprises two movable positioning arms 56 and 57. These arms are curved (for instance, semi-circular) and can be pivoted between an open position as shown in FIG. 3A and a closed position as shown in FIG. 3B. In the closed position the movable positioning arms 56, 57 together with the curved sections of the stationary support frame 55 form a clamp for firmly holding the tubular storage assembly 8.

In FIGS. 3A, 3B further shown is a (optional) pusher 53 that is arranged close to a first (proximal) end 58 of the tubular storage assembly 8. This pusher 53 serves on one hand to push the containers 1 previously stored inside the tubular storage assembly 8 along the guiding elements 10 towards a second (distal or discharge) end 59, opposite the first end 58 towards the discharge device 52 and on the other hand to keep the guiding elements 10 in proper alignment with the discharge device 52.

Referring to FIGS. 3A, 3B, the discharge device 52 is positioned at the discharge end 59 of the storage assembly 8. The discharge device 52 is configured to remove the container 1 from the tubular storage assembly 8 and move the containers 1 one by one from this second discharge end 59 of the tubular storage assembly 8 towards a discharge region of the discharge device 52 where the containers 1 are collected for further transport. The discharge device 52 is connected or associated with the discharge apparatus 54. The discharge apparatus 54 may in turn connect to a station, for further transport of the containers 1, for instance in the direction of one or more handling stations.

Discharge Device

Figure 4:
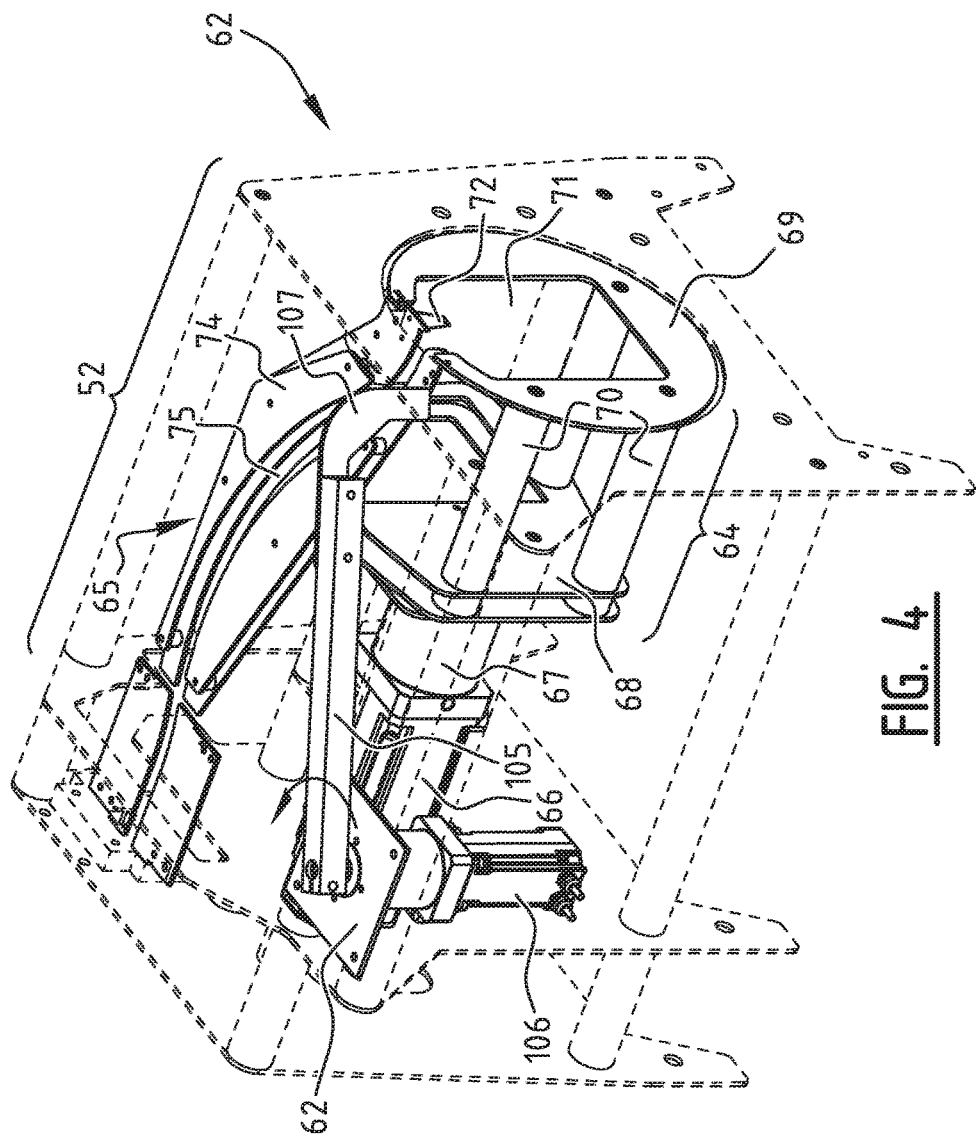
FIG. 4 is a partly cut-away side view of an embodiment of the discharge device of FIGS. 3A and 3B.

In this section embodiments of the discharge device 52 will be described in more detail referring to FIGS. 4-6. FIG. 4 shows (partly in dotted lines, partly in solid lines) a stationary discharge device frame 62. In this frame 62 a rotor or gripper unit comprising a rotatable gripper support 64 and a slotted gripper 65 is mounted. The rotatable gripper support 64 can be driven by an electric motor 66 which is connected to the stationary frame 62. The rotatable gripper support 64 comprises a rotatable drive shaft 67 which is connected to a construction comprising a set of parallel first support plates 68 and one or more parallel second support plates 69. The support plates 68, 69 are interconnected by four connection bars 70. The support plates 68, 69 are connected to the drive shaft 67 and can be rotated along an imaginary axis of rotation (extending in axial direction) corresponding with the rotational symmetry axis of the tubular storage assembly 8. Inside the second support plate 69 a central opening 71 is provided that allows the passage of a container 1 removed from the tubular storage assembly 8. This central opening 71 includes an infeed opening that allows the passage of respective dispensing spouts 5 of the containers 1 when they are received by the discharge device 52.

The rotatable gripper support 64 forms a support for the earlier mentioned slotted gripper 65. The slotted gripper 65 comprises one or more plates 74 extending in a general axial direction. The one or more plates 74 are provided with an elongated, curved opening or slot 75 dimensioned to carry a row of spouts 5 of discharged containers 1. The gripper 65 may rotate relative to the stationary tubular storage assembly 8 and grip the spouts 5 of the containers 1 stored therein.

FIG. 4 shows a construction for removing the containers 1 carried by the slotted gripper 65 and guiding the spouts 5 thereof towards the discharge apparatus 54. This construction comprises a rotatable arm 105 (herein also referred to as the sweeper arm).

The rotatable arm 105 is rotatably mounted to the stationary frame 62 and can be controlled by a suitable controller, for instance controller 76 schematically shown in FIG. 3B, to rotate by using a drive motor 106 connected to the frame 62 as well. The arm 105 has at its free end a downward projecting arm end 107 which is shaped to engage with a spout 5 of a container 1 and push this spouts 5 downstream along the slot 75, as will be explained hereafter.

Starting from the situation wherein the slot 75 of the slotted gripper 65 is essentially empty, the rotatable gripper support 64 and the slotted gripper 65 connected thereto are rotated by the motor 66 to move relative to the stationary positioned tubular storage assembly 8 (of which in the cut-away FIGS. 5 and 6 only a few containers 1 have been shown) in a rotation direction $R_{D1}$. In this movement, a hook 72 which is mounted on the parallel second support plates 69 and projected to the central opening 71 from the plate 74 of the slotted gripper 65 is able to catch successive spouts 5 of containers 1 and move each caught spout 5 into the slot 75. In this manner the slot 75 is filled with a container 1 every time the rotatable gripper support 64 and the slotted gripper 65 is rotated, resulting in a row of spouts moving in downstream direction through the slot 75 (FIG. 5).

Figure 5:
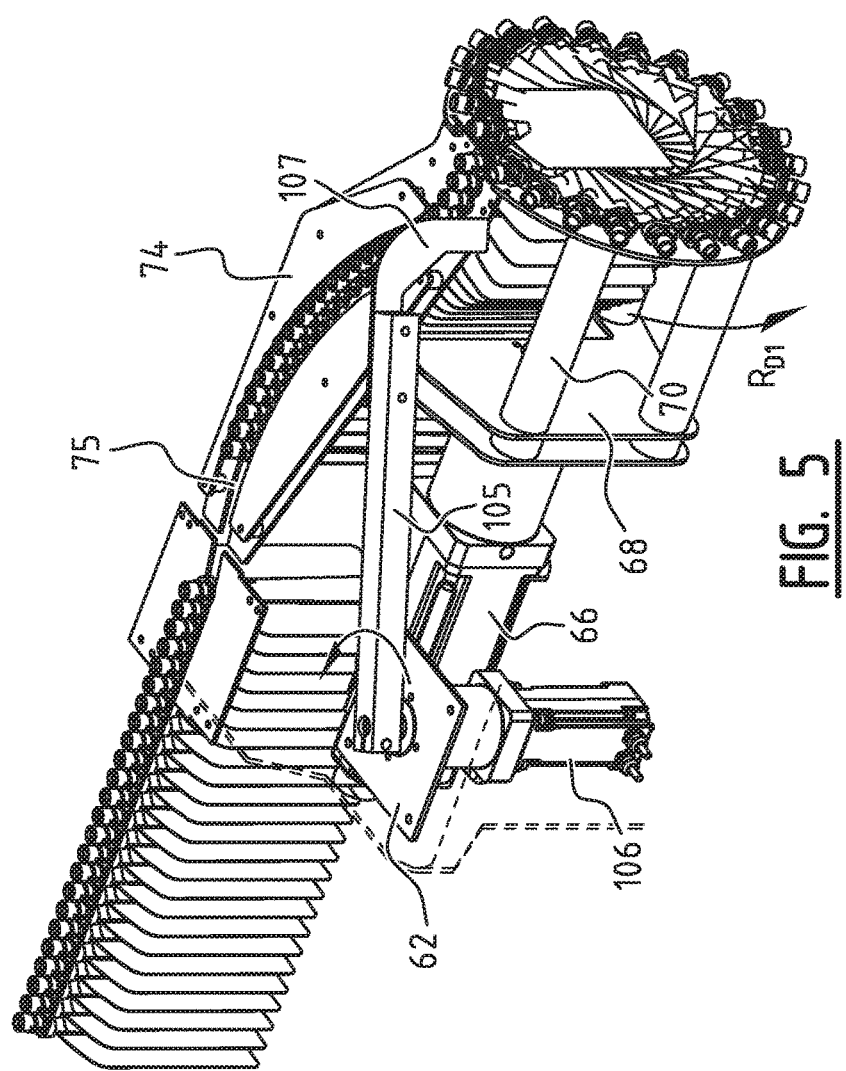
FIGS. 5 and 6 are a partly cut-away views of the discharge device, before and after rotation of the sweeper arm.
Figure 6:
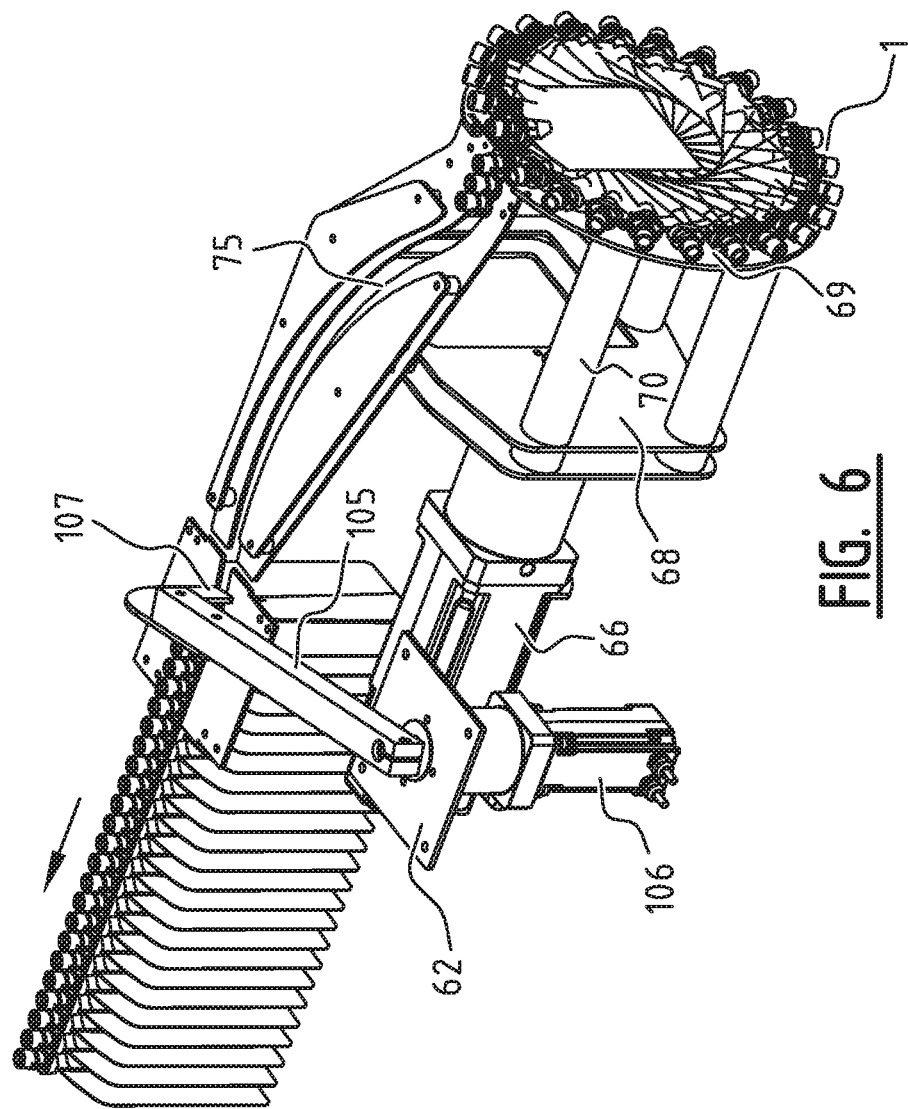
Figure 7:
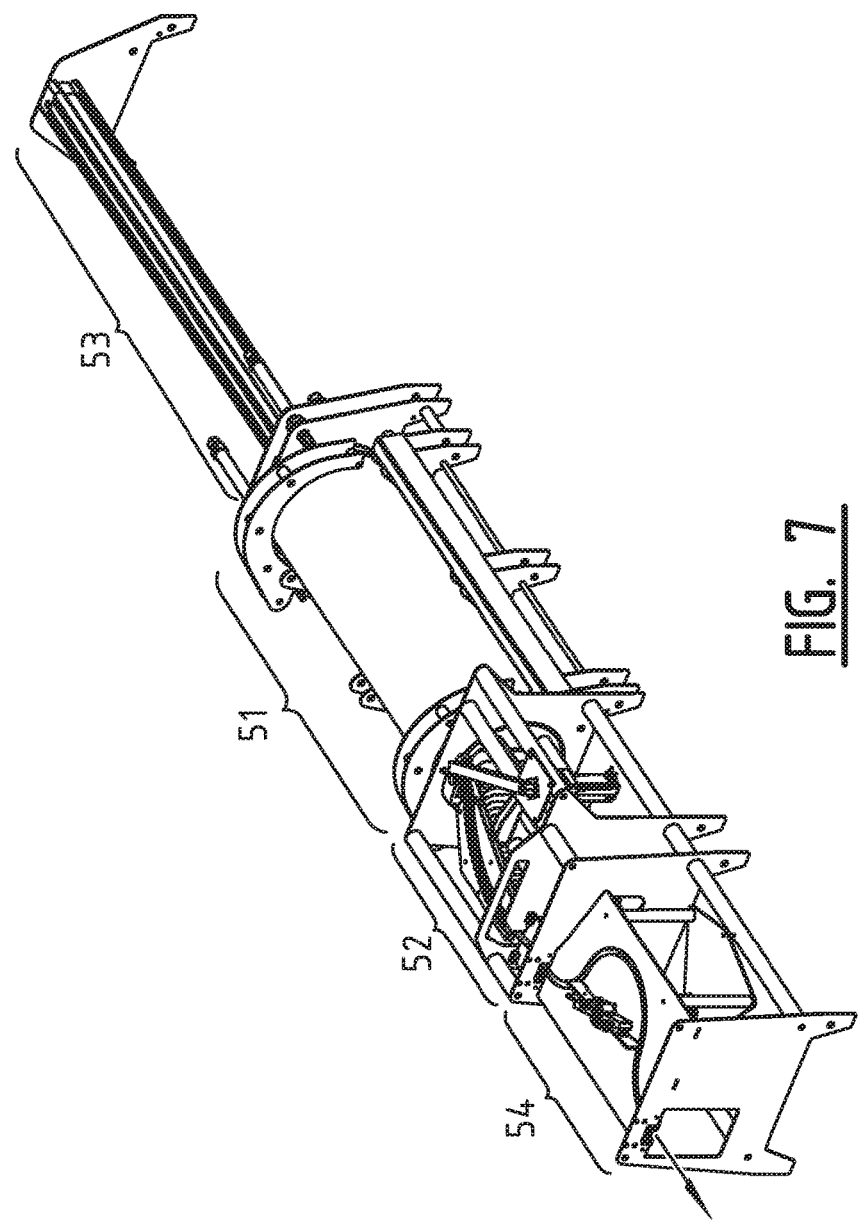
FIGS. 7 and 8 are further side views in perspective of the discharge system of FIGS. 3A and 3B.
Figure 8:
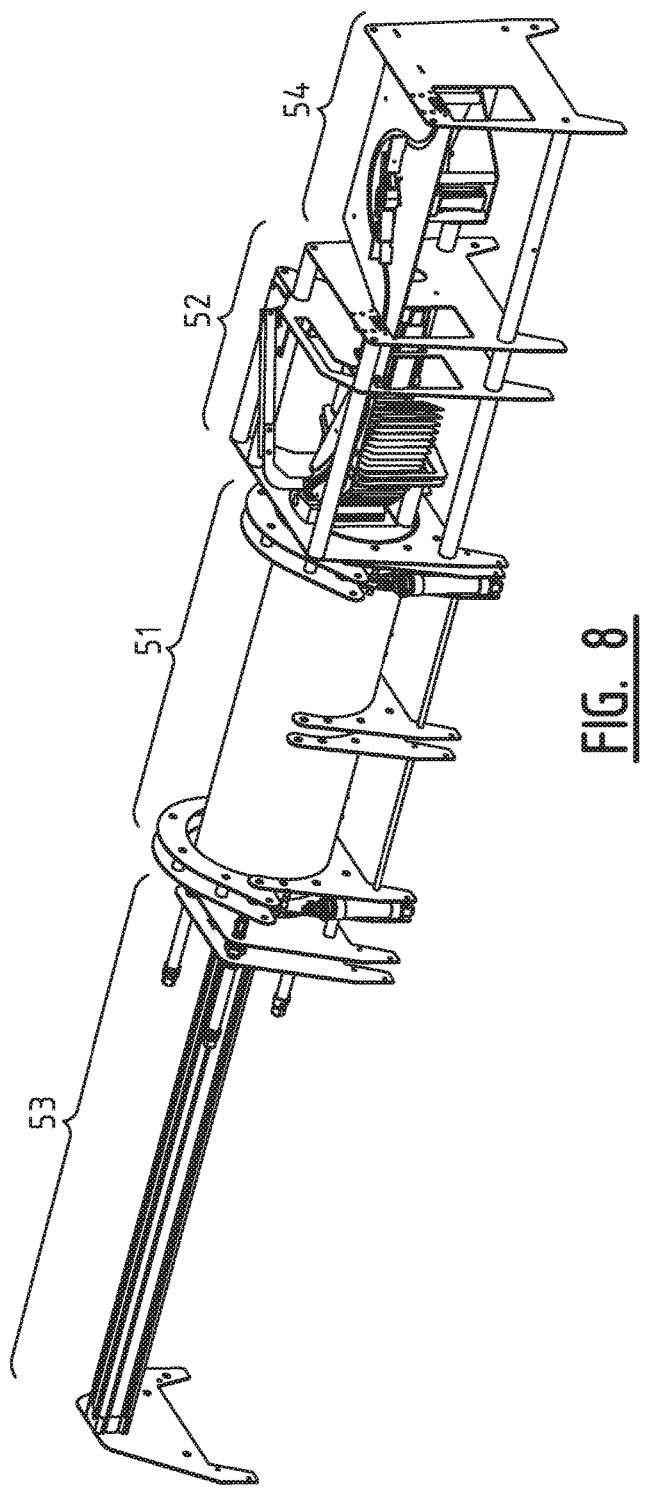
Figure 9:
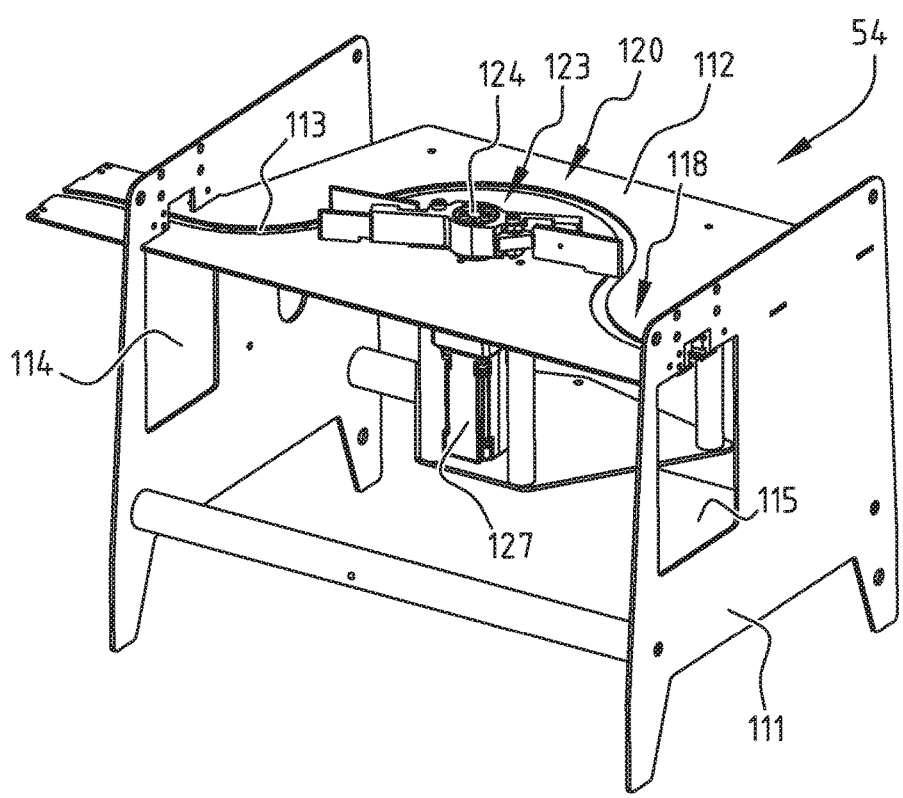
FIGS. 9 and 10 are detailed views in perspective of an embodiment of the discharge apparatus.
Figure 10:
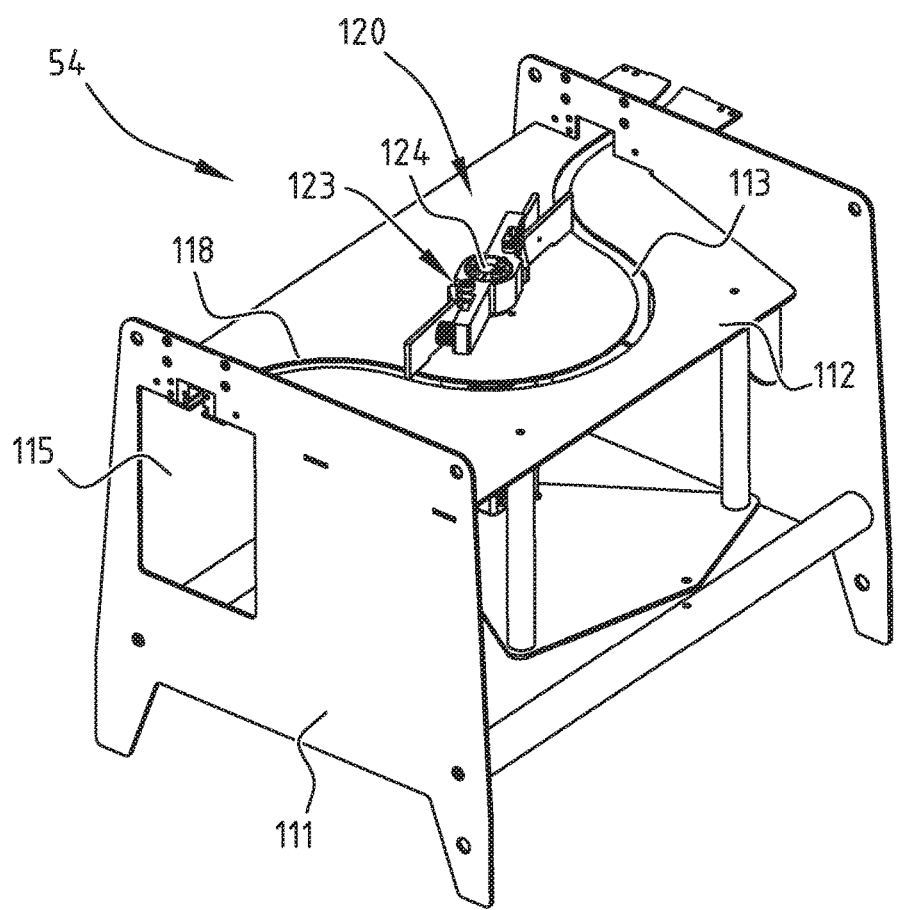

Once the rotatable gripper support 64 has performed a full revolution and the slotted gripper 65 has returned to its starting position (as shown in FIG. 5), the rotation of the rotatable gripper support 64 is stopped and the containers 1 accumulated in the slotted gripper 65 are ready to be discharged towards the discharge apparatus 54. At this moment the sweeper arm 105 which in the situation of FIG. 5 extends in its original position, is moved or rotated from the start position shown in FIG. 5 to the end position shown in FIG. 6. While rotating to the end position the downward projecting arm end 107 of the sweeper arm 105 engages one of the spouts 5 in the slot 75 and pushes the entire row of spouts 5 in a substantially axial direction onto the discharge apparatus 54 downstream of the discharge device 52. Once the row of spouts 5 is received by the discharge apparatus 54 and the sweeper arm 105 reaches the end position wherein the arm end 107 is no more above the slotted gripper 65, the rotatable gripper support 64 of the discharge device 52 starts rotating again to accumulate the next batch of containers 1 from the tubular storage assembly 8 maintained by the storage assembly support 51. As described above, the supply of containers 1 from the discharge device 52 and arriving at the discharge apparatus 54 is in batches (batchwise). The number of containers 1 in a batch may be equal to the number of the guiding elements 10 in a tubular storage assembly 8. In this embodiment the rotatable gripper support 64 may stop at the end of every full, 360 degree rotation relative to the stationary tubular storage container 8 and have the sweeper arm 105 sweep the containers 1 to the discharge apparatus 54. In other embodiments a batch may contain more or fewer containers 1. For example, a batch may contain a number of containers 1 that is twice the number of the guiding elements 10 of the tubular storage assembly 8 when the rotatable gripper support 64 is rotated over two full 360 degree rotations (two revolutions) before stopping to discharge its collected containers 1.

Referring to FIGS. 7-13 an embodiment of a discharge apparatus 54 is shown. The discharge apparatus 54 comprises a container support including a frame 111 to which a support element 112 is mounted. The support element 112 comprises a support plate and is provided with an elongated opening 113 for carrying a row of spouts 5 of a plurality of spouted containers 1 from an inlet 114 to an outlet 115. The inlet 114 of the support element 112 is associated with (for instance connected to) the discharge device 52 and configured to receive successive batches of spouted containers 1 in the elongated opening 113. The discharge apparatus 54 is further configured to urge a row of the batch of the containers 1 towards an outlet region 118 close to the outlet 115. In the outlet region 118 the containers 1 are waiting to be further transported downstream, for instance to a processing station for instance, a container handling line wherein the containers are filled with foodstuffs or the like). While waiting to be transported further, i.e. during receipt of the batches and in the time intervals between receipt of consecutive batches, the containers are kept being urged (for instance by pushing action of a biasing unit 120, to be described hereafter) in the discharge direction. The containers 1 may be transported in a controlled speed by a controllable means in the outlet region 118 that may be controlled by the controller 76. The controllable means may be embodied as a wheel 150 arranged at the downstream end of the outlet region 118. The rotating speed of the wheel 150 is controlled by the controller 76 to discharge the containers 1 through the outlet 115 to the further processing station in a preferable controlled speed.

In another embodiment the containers, while being urged in the discharge direction, are kept in the elongated opening of the discharge apparatus 54 by a controllable stop element that may be moved to an opened and closed position by the controller 76. The biasing unit 120 in this embodiment may be controlled so that the containers in the outlet region 118 close to the outlet 115 are continuously pressed in the direction of the outlet 115 while they are prevented from being moved, for instance by the controllable stop element. When the stop element is controlled to open the passage to the outlet, the containers immediately start to move in the discharge direction because of the biasing force that is being exerted on the containers.

Figure 11:
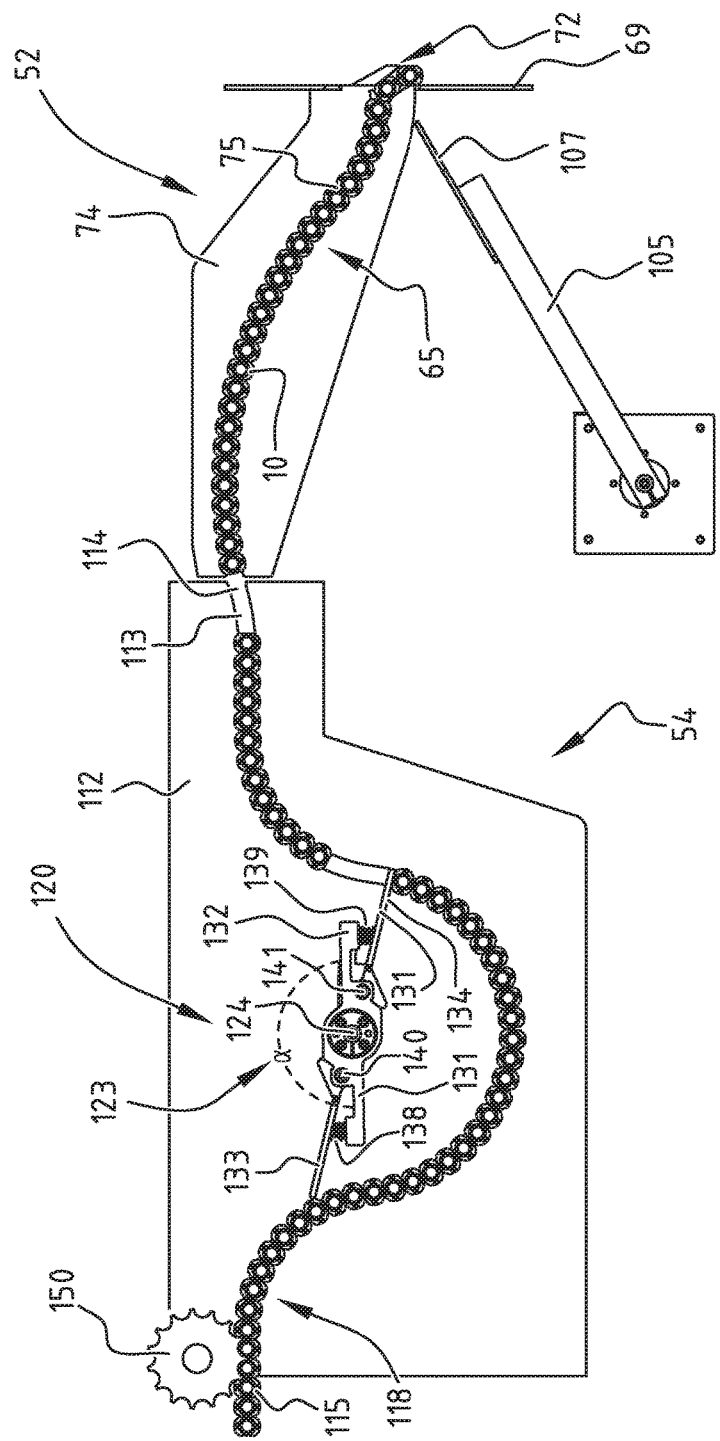
FIGS. 11-13 are schematic top views of a discharge device and a discharge apparatus of an embodiment, wherein the discharge process of both the discharge device and discharge apparatus is elucidated.
Figure 12:
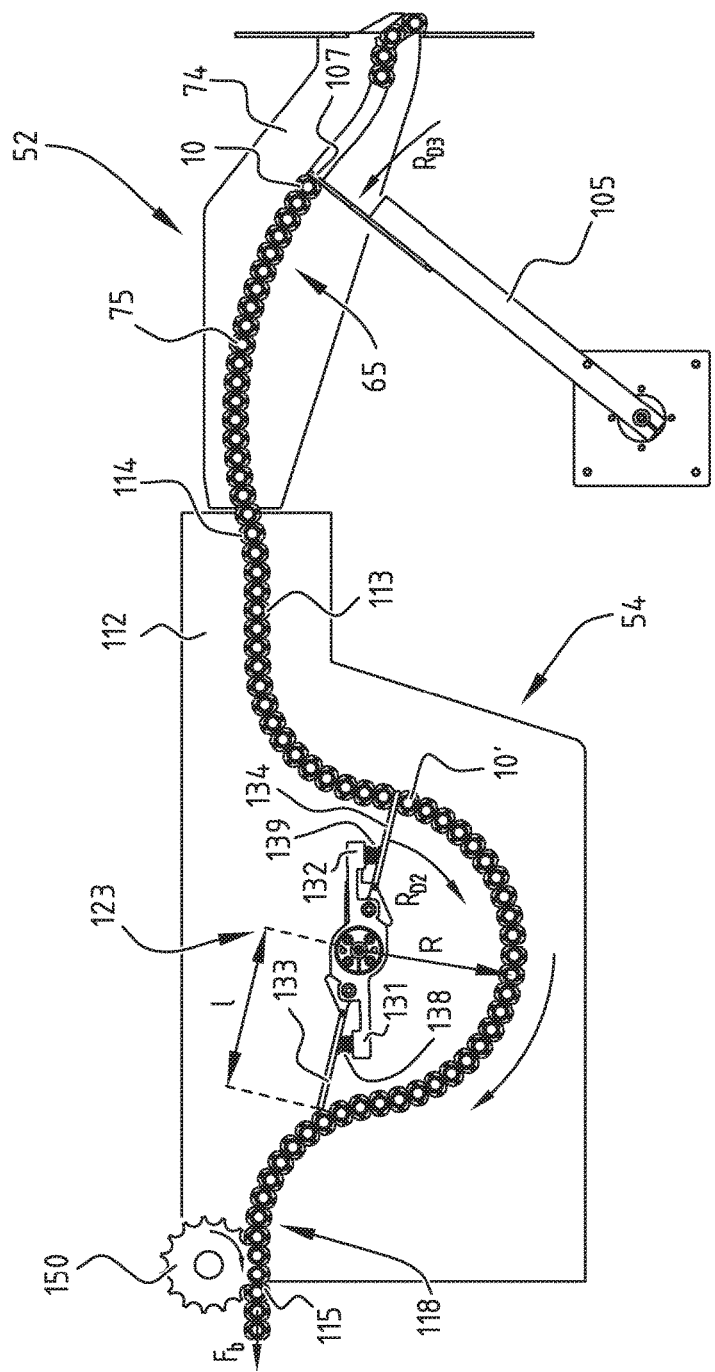
Figure 13:
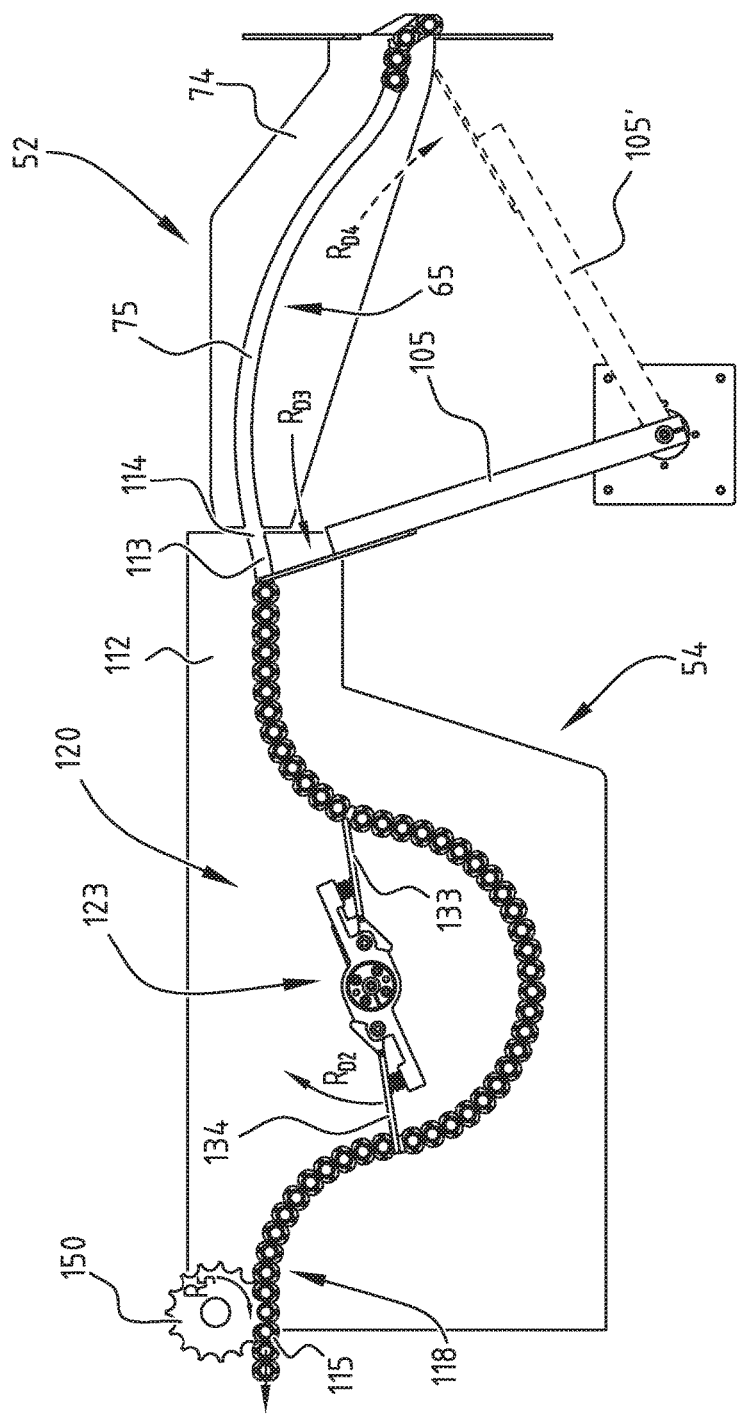

In the embodiment shown in the FIGS. 11-13, the biasing unit 120 is configured to apply a biasing force to at least a subset of the spouts 5 received inside the elongated opening 113 in the support element 112 to force the spouts 5 and associated containers 1 towards the outlet 115. By pushing action the contacted spout(s) 5 (and at the same time the spouts 5 downstream of the contact spout(s) 5) are urged downstream towards the outlet 115 of the discharge apparatus 54.

The biasing action of the biasing unit 120 can be used to provide a continuous discharge of containers 1 at the outlet 115 of the discharge apparatus 54. Even the discontinuous (batch wise) input of the containers 1 at the inlet 114 can be converted into a continuous output at the outlet 115. Due to this construction, rotatable biasing element 123 is comprised as being controlled by the controller 76 to be rotated continuously and containers 1 are continuously moved towards the above-mentioned further processing stations. The controller 76 is configured to control a drive motor 127 to vary the electric motor torque applied to the rotatable biasing element 123. The controller 76 is further configured to apply an enough torque to move the spouts 5 towards the outlet 115 and to continuously apply the biasing force to the spouts 5 but not to disturb the continuous discharge of the containers 1 from the outlet 115.

An embodiment of the biasing unit 120 is shown in the FIGS. 11-13 and comprises the rotatable biasing element 123 connected to an upright shaft 124 that is rotatably mounted to the support element 112. The shaft 124 is mounted at a short distance from the elongated opening 113. In the area close to the shaft 124 of the biasing element 123 the elongated opening 113 has a curved shape, more specifically a generally circular arch portion. The shaft 124 may be arranged at a inner side of this circular arch portion and be rotatable around an axis positioned at or near the center point of the circular arch portion.

The rotatable biasing element 123 is driven by a drive motor 127 mounted at the bottom side of the support element 112 and arranged to rotate in a substantially horizontal plane. The rotatable biasing element 123 comprises a plurality of pusher elements. In the shown embodiment the rotatable biasing element 123 has two pusher elements extending at an angle of 180 degrees relative to each other. In other embodiments the number of pusher elements is larger, for instance 3, 4 or more, and the angle between the pusher elements usually is correspondingly smaller. The more pusher elements available, the easier it sometimes is to permanently apply a force on the containers 1. According to embodiments of the present disclosure there is always at least one pusher element in contact with a container to exert the biasing force during rotation of the rotatable biasing element 123. Due to the specific curved shape of the elongated opening 113 a permanent contact and thereby a permanent (yet varying) biasing force can be applied to the containers 1 even when the biasing element 123 only has the above-mentioned two pusher elements. The pusher elements may be arranged so that at essentially all times during rotation of the biasing element 123 at least one pusher element is in contact with a spout 5 in the row of spouts 5 to continuously push the spouts 5 towards the outlet 115.

In embodiments of the present disclosure the electric drive motor 127 continuously applies torque to the drive shaft 124 of the rotatable biasing element 123. When the resistance encountered by the biasing element 123 is relatively low, the torque will cause the biasing element 123 to rotate. When the resistance gets higher, for instance because the transporting speed of the containers 1 through the outlet 115 is slower than that of the containers 1 pushed by the biasing unit 123 the torque is decreased to provide a permanent bias (force) for the containers 1 so that the containers 1 keep being urged towards the outlet 115. Alternatively or additionally, the drive motor 127 may be controlled to vary the torque applied to the containers 1. When the drive motor 127 is controlled to apply a relatively large torque to the containers 1, the containers 1 are likely to move towards the outlet 115. When the motor 127 is controlled to keep applying a relatively small torque, this torque may sometimes not be sufficient to cause the row of containers 1 to move towards the outlet region 118, but may still be sufficient to keep applying a permanent biasing force to the containers 1 in the outlet region 118.

Alternatively or additionally, in embodiments of the present disclosure, the drive motor 127 may be controlled to be switched off or at least to stop the application of torque to the drive shaft 124 when the transporting speed of the containers 1 through the outlet 115 is slower than that of the containers 1 pushed by the biasing element 123. In this case, the required biasing force may be provided by a mechanical means, for instance by one or more spring elements arranged between the drive shaft 124 and the rotatable biasing element 123 and/or in the rotatable biasing element 123 itself. More specifically, in embodiments of the present disclosure, at least a part of the biasing forces is delivered by using a spring mounted pusher element.

Referring to FIGS. 11-13 an embodiment of the pusher element is shown, the biasing element 123 comprises a first back plate 131 and a second back plate 132 fixedly connected to the drive shaft 124. These two back plates 131, 132 are extending at an angle α of 180 degrees. The biasing element 123 also comprises a first pusher plate 133 and a second pusher plate 134, both pusher plates being connected to the back plates 131, 132 with pivot elements 140,141 so as to be pivotable in a plane perpendicular to the drive shaft 124.

The pusher plates 133,134 are arranged at a position in front of the back plates 131, 132 relative to the rotation direction $R_{D2}$ of the drive shaft 124. More specifically, a first pusher plate 133 is arranged in front of the first back plate 131 and a second pusher plate 134 in front of the second back plate 132. The pusher plates 133, 134 are connected to the back plates 131, 132 with spring elements 138,139, for instance coil springs. Each of the pusher plates 133,134 has a length (L) which is at least as large as the radius (R) of the circular arch portion of the elongated opening 113 (FIG. 12).

In this way at least one of the pusher plates 133,134 are able to keep engaged with the spouts 5 and apply a biasing force ($F_b$) on the containers 1 and all downstream containers 1.

Due to the specific arrangement of the pusher plates 133, 134, the back plates 131, 132 and the spring elements 138, 139, the pusher plates 133, 134 are biased in rotational directing. The biasing element 123 therefore provides a permanent positive biasing force on the containers 1.

Referring to FIGS. 11-13, an example of a method of transporting containers 1 from the tubular storage assembly 8 filled with spouted containers 1 to the further processing station through the discharge device 52 and the discharge apparatus 54 is described. FIG. 11 shows the situation wherein the slotted gripper 65 has been halted after the discharge device 52 has accumulated a number of containers 1 transported from the tubular storage assembly 8. In FIG. 11 the slotted gripper 65 is located in its starting position wherein the support element 112 and the plate 74 of the slotted gripper 65 are aligned. In the starting position the spouts 5 of the containers 1 accumulated in the slot 75 of the slotted gripper 65 are ready to be discharged towards the discharge apparatus 54. At this moment the sweeper arm 105 is rotated (in the direction of $R_{D3}$ in FIG. 12) from the start position to the end position shown in FIG. 13. While rotating to the end position the downward projecting arm end 107 of the sweeper arm 105 engages one of the spouts 5 in the slot 75 and pushes the entire row of spouts 5 in a substantially axial direction into the elongated opening 113 of the support element 112. The sweeper arm 105 is rotated in a manner that the arm end 107 pushes the entire row of spouts 5 through the slot 75 into the opening 113, but does not push the spouts 5 too much to force the rotatable biasing element 123 to be rotated by the row of the spouts 5. In other words, the power of the sweeper arm 105 pushing the spouts 5 into the opening 113 is equal to or less than the power of the rotatable biasing element 123 pushing the spouts 5. In this manner, the spouts 5 pushed by the sweeper arm 105 do not urge the rotatable biasing element 123 against its own movement. This allows the rotating speed of the rotatable biasing element 123 to be controlled separately from the moving speed of the sweeper arm 105.

The rotatable biasing element 123 moves (in the direction $R_{D2}$) separately from the sweeper arm 105 so that the pusher plates 133, 134 push a subset of the spouts 5 of the containers 1 towards the outlet 115. The torque applied to the pusher plates 133, 134 is controlled depending on the resistance that the biasing element 123 is encountered, and the pusher plates 133, 134 are always urged to the spouts 5 in the opening 113 towards the outlet 115. When the wheel 150 is arranged at the outlet region 118, the containers 1 which are discharged to the further processing stations are discharged in the controlled speed. The rotatable biasing element 123 is rotated in a manner that the pusher plates 133, 134 is urged to the row of the spouts 5 in the opening 113 towards the outlet 115, but doesn't push the spouts 5 too much to force the wheel 150 rotated by the row of the spouts 5.

FIG. 13 shows that the sweeper arm 105 continues to rotate (in the direction $R_{D3}$) until all containers 1 have been moved into the opening 113 of the support element 112. Next, the slotted gripper 65 starts rotating again (while the sweeper arm 105 remains in the end position) to accumulate a next batch of containers 1 from the tubular storage assembly 5. As soon as the slotted gripper 65 is filled with the spouts 5 and the plate 74 of the slotted gripper 65 is again aligned with the support element 112, the sweeper arm 105 returns (i.e. rotates backwards, in the direction $R_{D4}$) to its original position (denoted in dotted lines) and is ready for sweeping the next batch of containers 1 onto the support element 112 of the discharge apparatus 54.

Figure 14:
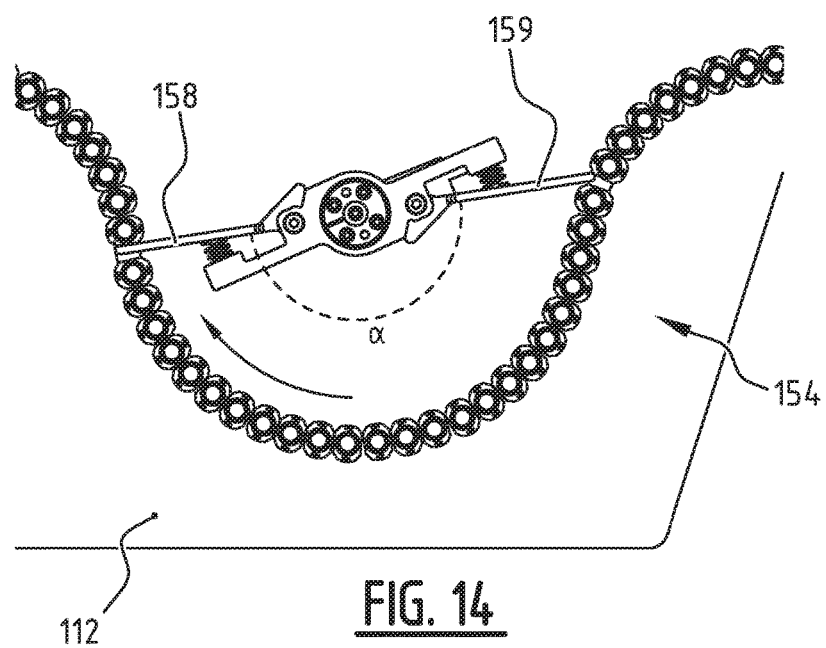
FIG. 14 corresponds to a portion of a FIG. 12 specifically showing the discharge apparatus, in a situation wherein a continuous supply of spouted containers is provided.
Figure 15:
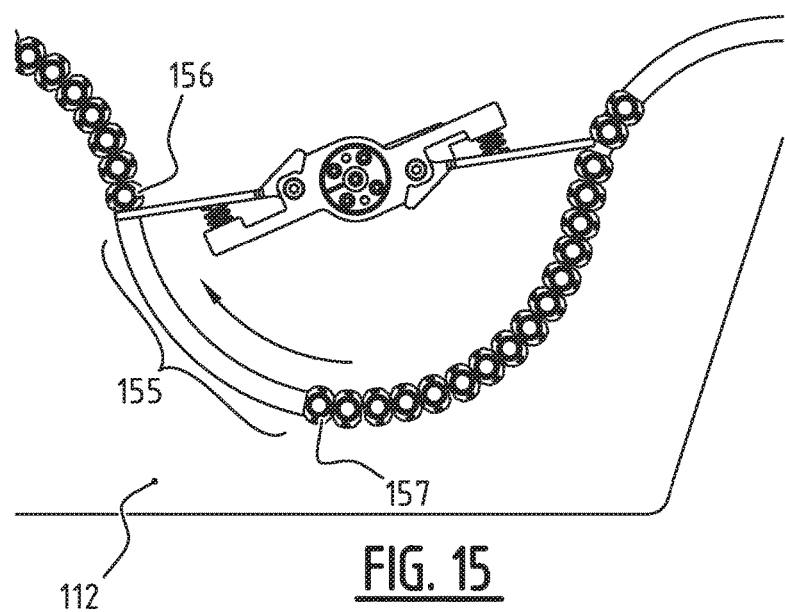
FIG. 15 is the schematic view of FIG. 14, wherein a gap in the supply of spouted containers is present.

Referring to FIG. 14, when there is a continuous supply of spouted containers from the discharge device 52, the pusher elements of the rotatable biasing element can continuously exert a biasing force on the containers. In other words, when sufficient containers are present in the tubular storage assembly, the sweeper arm 105 pushes a batch (consisting of a predefined number of spouts or spouted containers) onto the discharge apparatus and the space in the elongated opening is completely filled up, resulting in a continuous pressure at the outfeed of the discharge apparatus. However, when pushing the last batch of spouted containers from the tubular storage assembly, the situation may occur that less than the predefined number of spouted containers are left in the tubular storage assembly. In this situation the sweeper arm 105 pushed a smaller number of spouted containers (i.e. smaller than the normal, predefined number of spouted containers) into the elongated opening of the discharge apparatus. An example of this situation is depicted in FIG. 15. The figure shows a gap 155 between the last spouted container 156 of the previous (full) batch and the first spouted container 157 of the last (partial) batch. If the pusher elements 158,159 have a fixed orientation relative to each other (i.e. they cannot rotate relative to one another) and if there are only two pusher elements that extend at an angle (α) of about 180 degrees relative to each other, a continuous pressure at the outfeed of the discharge apparatus 154 cannot always be guaranteed.

One option would be to increase the number of pusher elements, for instance providing the discharge apparatus with three, four or more pusher elements, wherein the pusher elements extend at smaller angles (smaller than 180 degrees) relative to each other. The pusher elements may still be driven by using one common drive motor. In case the discharge apparatus has a sufficient number of pusher elements, the spouted containers can be pushed with continuous pressure towards the outfeed of the discharge apparatus 154, irrespective of the presence of a gap 155.

Figure 16:
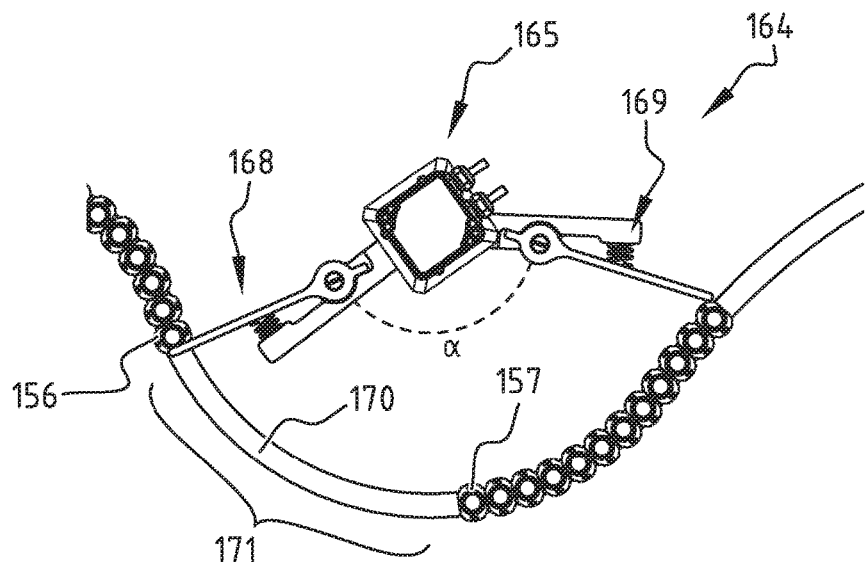
FIGS. 16 and 17 are schematic views of a further embodiment of a discharge apparatus, wherein the discharge apparatus is configured to have rotatable biasing elements that may be rotated relative to each other.
Figure 17:
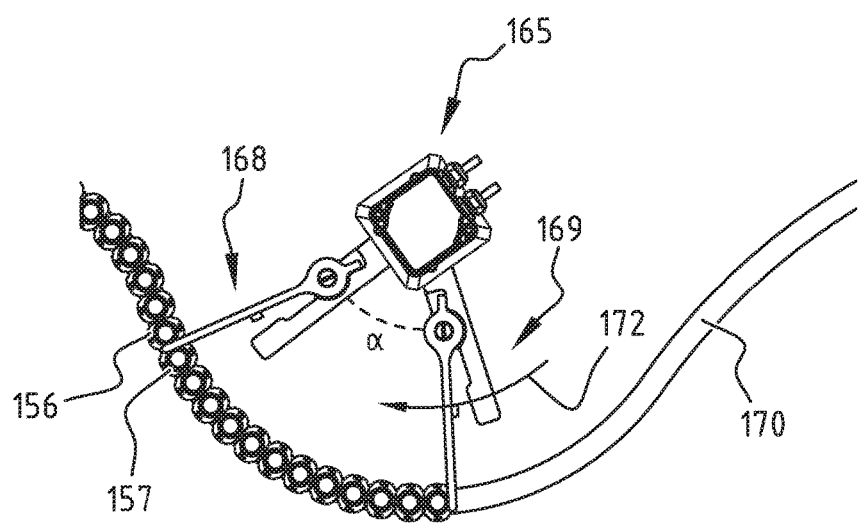

Another option would be to make at least one of the pusher elements movable relative to the other pusher elements. An embodiment wherein pusher elements are mutually rotatable is shown in FIGS. 16 and 17. The figures show a discharge apparatus 164 comprising a biasing element 165 comprising two pusher elements 168,169. Rather than a fixed relationship between the pusher elements, the pusher elements of the discharge apparatus 164 may be rotated relative to each other. To this end the pusher elements may be individually driven by respective drive motors. The first pusher element 168 may be driven by a first drive motor (for instance, drive motor 127 arranged below the support element 112) while the second pusher element 169 may be driven by a second drive motor (for instance, a drive motor arranged above the support element 112).

In the situation wherein the sweeper arm 105 pushes a (partial) batch of containers containing a smaller number of spouted containers into the elongated opening 170 of the discharge apparatus 164 and a gap 171 occurs (cf. FIG. 16), the second drive motor is controlled to rotate the second pusher element 169 faster (in rotation direction 172) than the first pusher element 168 osso that the angle (α) decreases. The pusher elements cannot pass each other, but can be moved sufficiently to cause the containers in the elongated opening 170 to move in such a manner, that the first container 157 of the partial batch eventually abuts the last container 156 of the previous (full) batch. In the meantime the first pusher element 168 maintains a continuous pressure on the last container 156 at least until the second pusher element 169 applies the biasing force to the last container 156. In this manner a continuous pressure at the outfeed of the discharge apparatus 164 can be guaranteed at all times.

The preceding merely illustrates the principles of the invention. It will be appreciated that those skilled in the art will be able to devise various arrangements which, although not explicitly described or shown herein, embody the principles of the invention and are included within the scope of the appended claims.

The invention claimed is:

1. A discharge apparatus for discharging a plurality of flexible spouted containers from a tubular storage assembly, the discharge apparatus comprising:
   a support element with an elongated opening for carrying a row of spouts of a plurality of spouted containers from an inlet to an outlet, wherein the support element is configured to receive successive batches of spouted containers in the elongated opening;
   a biasing unit configured to move at least a subset of the spouts in the elongated opening in the support element towards the outlet, the biasing unit including:
      a rotatable biasing element including a plurality of pusher elements and at least one of the pusher elements engages the spout and applies the biasing force to the subset of the spouts; and
      a drive motor configured to rotate the biasing element; and
   wherein the biasing unit configured to continuously apply a biasing force to the subset of spouts to continuously urge the containers towards the outlet,
   wherein the storage assembly comprises a plurality of elongated guiding elements onto which a plurality of rows of dispensing spouts can be carried,
   wherein the guiding elements are configured to be maintained in a substantially tubular arrangement while the containers extend in a generally helical trajectory in the interior formed by the tubular arrangement.

2. The discharge apparatus as claimed in claim 1, wherein the biasing unit is configured to continuously discharge containers from the outlet.

3. The discharge apparatus as claimed in claim 1, comprising a controller configured to control the drive motor to vary the electric motor torque applied to the rotatable biasing element, wherein the controller is further configured to apply an enough torque to move the spouts towards the outlet and to continuously apply the biasing force to the spouts but not to disturb the continuous discharge of the containers from the outlet in a controlled speed.

4. The discharge apparatus as claimed in claim 1, wherein a pusher element comprises:
   a back plate fixedly connected to a drive shaft;
   a pusher plate pivotably connected to the drive shaft or to the back plate;
   a spring element arranged between the pusher plate and back plate so as to bias the pusher plate in the direction of rotation.

5. The discharge apparatus as claimed in claim 4, wherein the pusher plate is arranged so as to be pivotable in a plane perpendicular to the drive shaft, wherein the pusher plate extends at a position in front of the back plate relative to the direction of rotation of the drive shaft.

6. The discharge apparatus as claimed in claim 1, wherein the rotatable biasing element comprises at least two pusher elements arranged so that essentially at all times at least one pusher element is in contact with a spout in the row of spouts to continuously push the contacted spout towards the outlet.

7. The discharge apparatus as claimed in claim 1, wherein the elongated opening in the container support comprises a circular arch portion wherein the rotatable biasing element is arranged to be rotatable around an axis positioned at or near the center point of the circular arch portion.

8. The discharge apparatus as claimed in claim 7, wherein the back plate has a length (L) equal to or larger than the radius of the circular arch portion.

9. The discharge apparatus as claimed in claim 1, comprising a control unit to continuously discharge the containers from the outlet.

10. The discharge apparatus as claimed in claim 1, wherein the biasing unit is configured to continuously discharge the containers which are discontinuously transported into the opening of the discharge apparatus from the inlet.

11. The discharge apparatus as claimed in claim 1, wherein the biasing unit is configured to continuously apply a biasing force to the subset of spouts to continuously urge them towards the outlet, irrespective of whether the spouts kept stationary or allowed to move towards the outlet.

12. Discharge apparatus as claimed in claim 1, wherein at least one of the pusher elements is rotatable relative to at least one of the other pusher elements.

13. Discharge apparatus as claimed in claim 1, wherein the biasing unit comprises:
 a first pusher element;
 a second pusher element;
 wherein the biasing unit is configured to rotate the second pusher element relative to the first pusher element.

14. Discharge apparatus as claimed in claim 13, wherein the biasing unit comprises a first drive motor configured to rotate the first pusher element, a second drive motor configured to rotate the second pusher element, and a controller configured to control the first and second drive motor to rotate the first pusher element independently from the second pusher element.

15. A discharge system for discharging a plurality of flexible, spouted containers from a tubular storage assembly, wherein each of the containers comprises a dispensing spout and wherein the storage assembly comprises a plurality of elongated guiding elements onto which a plurality of rows of dispensing spouts can be carried, wherein the guiding elements are configured to be maintained in a substantially tubular arrangement while the containers extend in a generally helical trajectory in the interior formed by the tubular arrangement, the discharge system comprising:
 a storage assembly support configured to support the tubular storage assembly, the guiding elements extending in axial direction;
 a discharge device configured to remove the containers from the tubular storage assembly and move the containers one by one from the second end of the tubular storage assembly towards a discharge region;
 a discharge apparatus as claimed in claim 1, wherein the elongated opening of the discharge apparatus is arranged to receive spouted containers from a discharge region of the discharge device;
 wherein the discharge device comprises:
  a gripper unit;
  a drive configured to rotate the gripper unit relative to the storage assembly;
 wherein the gripper unit is configured to grip dispensing spouts of containers successively passing by the gripper unit, to transport the gripped dispensing spouts and associated containers in essentially the axial direction and to accumulate the dispensing spouts and containers in the discharge region.

16. The discharge system as claimed in claim 15, wherein the discharge device comprises a rotatable sweeper arm and a sweeper arm drive configured to rotate the sweeper arm for moving the accumulated spouts out of the gripper unit into the elongated opening of the discharge apparatus, and wherein the biasing unit comprises a rotatable biasing element configured to rotate at least partly synchronously with the sweeper arm.

17. A method of discharging a plurality of flexible spouted containers from a tubular storage assembly having guiding elements maintained in a substantially tubular arrangement while the spouted containers extend in a generally helical trajectory, the method comprising:
 receiving successive batches of spouted containers in an elongated opening of a support element for carrying the spouted containers from an inlet to an outlet of the support element, the batches of spouted containers being provided to the inlet in a discontinuous manner;
 causing the spouted containers to move through the elongated opening towards the outlet while continuously maintaining a biasing force to at least a subset of the spouted containers received inside the elongated opening to bias the spouted containers and associated containers towards the outlet, the biasing force applied by a biasing unit including:
  engaging the spouted containers and applying the biasing force to the subset of the spouted containers with at least one pusher element of a plurality of pushing elements of a rotatable biasing element; and
  rotating the biasing element with a drive motor.

18. The method as claimed in claim 17, wherein maintaining a biasing force to at least the subset of the spouts comprises applying a sufficient biasing force with the biasing unit to continuously discharge the containers from the outlet.

* * * * *